UTLEY & TEED.
Straw Cutter.
No. 27,487.  Patented March 13, 1860.
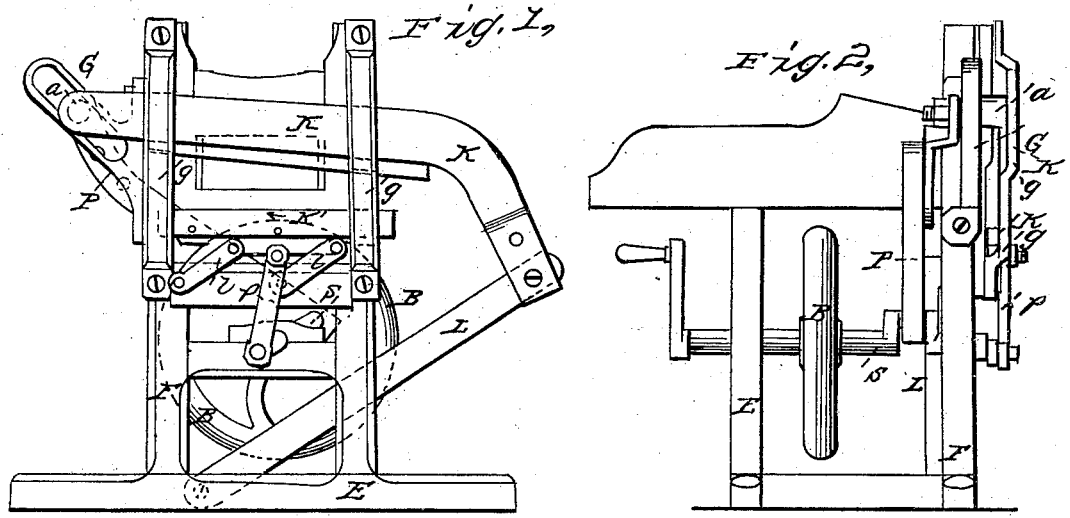
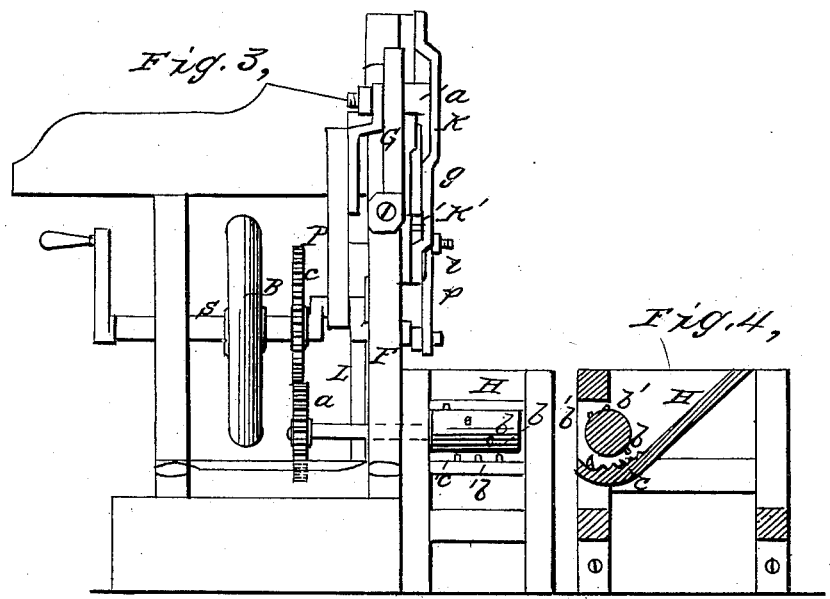
WITNESSES:
T. Ball
N. Smith
INVENTOR:
D. Utley & L. Teed
per Geo Patten
atty

UNITED STATES PATENT OFFICE.

DAVID UTLEY, 2D, AND PELL TEED, OF LEICESTER, NEW YORK.

STRAW-CUTTER.

Specification of Letters Patent No. 27,487, dated March 13, 1860.

*To all whom it may concern:*

Be it known that we, DAVID UTLEY, 2d, and PELL TEED, of Leicester, in the county of Livingston and State of New York, have invented a new and useful Improvement in Straw-Cutters; and we do hereby declare that the following is a full, clear, and exact description of the same, reference being had to the annexed drawing, forming part of this specification, in the several figures of which similar characters of reference denote the same part.

Figure 1 is a front view of the cutting mechanism. Fig. 2 is a side view of the same. Fig. 3 is also a side view with the picking mechanism attached. Fig. 4 is a vertical, longitudinal section of the picking portion of the machine.

The nature of our invention consists in the arrangements of devices hereinafter set forth for the purposes specified.

In the drawing F is the frame of the machine, K, the large knife working in guides $g$, in front of the mouth of the machine, attached at one end to lever L, which is connected by a bolt with the lower part of the frame, this lever giving it a drawing stroke, and also assisting to raise it above the mouth for the fodder to be fed forward, the power being applied to the knife K, by pitman P, from crank shaft S, the pitman being attached to an arm $a$, at the heel of the knife, said arm moving in a diagonal slotted guide G, to correspond with the motion of lever L.

Under the mouth is the other and smaller knife K′, also moving in guides $g$, moved by pitman $p$, on the end of the crank shaft S, and having two small levers $l$, $l$, attached to it, and the frame of the machine which give it a diagonal sliding movement in a contrary direction to that of knife K.

B, is a balance wheel on crank shaft S.

H, is the inclined hopper under the knives having the ribbed concave bed $c$, with its row of teeth $b$ at the edge, R, the roller with its spiral rows of teeth $b$; the revolution of roller R, being caused by the pinion $d$, on its shaft gearing with the cog wheel C, on crank shaft S.

The straw or fodder is placed in the box of the machine, and fed through the mouth between the knives, and the power being applied to crank shaft S, the movement of the knives K, K′, is produced in opposite direction by means of their pitmen P, and $p$, the levers L and $l$, giving them a diagonal or drawing cut, thus cutting off the straw or fodder which falls into the inclined hopper H, and is picked to pieces by the revolution of roller R, in concave $c$, at the bottom of the incline, the teeth $b′$, of the roller coming in contact with those $b$, in the concave, and separating the cut fodder into finer pieces, rendering it better for use. The motion of roller R, being also caused by crank shaft S, its pinion $d$, meshing with cog-wheel C, on said shaft.

We claim—

The arrangement of knives K K′, levers L $l$, pitmen P $p$, slotted guide G, crank shaft S, hopper H, concave bed $c$ and toothed roller R as and for the purposes set forth.

In testimony whereof we have hereunto signed our names before two subscribing witnesses.

DAVID UTLEY, 2D.
PELL TEED.

Witnesses:
D. L. WARNER,
JAMES L. DODGE.